(12) United States Patent
Park et al.

(10) Patent No.: US 11,475,770 B2
(45) Date of Patent: Oct. 18, 2022

(54) ELECTRONIC DEVICE, WARNING MESSAGE PROVIDING METHOD THEREFOR, AND NON-TRANSITORY COMPUTER-READABLE RECORDING MEDIUM

(71) Applicant: SAMSUNG ELECTRONICS CO., LTD., Suwon-si (KR)

(72) Inventors: Chan-jong Park, Seoul (KR); Ji-man Kim, Suwon-si (KR); Do-jun Yang, Yongin-si (KR); Hyun-woo Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 555 days.

(21) Appl. No.: 16/485,677

(22) PCT Filed: Mar. 29, 2018

(86) PCT No.: PCT/KR2018/003734
§ 371 (c)(1),
(2) Date: Aug. 13, 2019

(87) PCT Pub. No.: WO2018/186625
PCT Pub. Date: Oct. 11, 2018

(65) Prior Publication Data
US 2020/0066158 A1 Feb. 27, 2020

(30) Foreign Application Priority Data

Apr. 6, 2017 (KR) .................. 10-2017-0044725
Nov. 24, 2017 (KR) .................. 10-2017-0157851

(51) Int. Cl.
*G06N 20/00* (2019.01)
*G06N 5/04* (2006.01)
*G08G 1/16* (2006.01)

(52) U.S. Cl.
CPC .............. *G08G 1/164* (2013.01); *G06N 5/04* (2013.01); *G06N 20/00* (2019.01); *G08G 1/166* (2013.01)

(58) Field of Classification Search
CPC ...... G08G 1/164; G08G 1/166; G08G 1/0104; G06N 5/04; G06N 20/00; G06N 3/006;
(Continued)

(56) References Cited

U.S. PATENT DOCUMENTS 5,541,590 A 7/1996 Nishio
7,698,055 B2 4/2010 Horvitz et al.
(Continued)

FOREIGN PATENT DOCUMENTS

JP   H0660300 A * 8/1992
JP   6-60300 A   3/1994
(Continued)

OTHER PUBLICATIONS

English Translation_JP2005313658A (Year: 2005).*
(Continued)

*Primary Examiner* — Peter D Nolan
*Assistant Examiner* — Ashley L Redhead, Jr.
(74) *Attorney, Agent, or Firm* — Sughrue Mion, PLLC

(57) ABSTRACT

An electronic device, a warning message providing method therefor, and a non-transitory computer-readable recording medium are provided. Disclosed is an artificial intelligence (AI) system using a machine learning algorithm such as deep learning and an application thereof. Disclosed, according to one embodiment, is an electronic device which can comprise: a position determination unit for determining a current position of the electronic device; a communication unit for receiving accident data and a driving situation; an output unit for outputting a warning message; and a processor for learning the received accident data to establish a
(Continued)

plurality of accident prediction models, selecting an accident prediction model to be applied from among the plurality of accident prediction models based on the determined current position, determining possibility of accident occurrence by using the selected accident prediction model, and controlling the output unit such that the output unit provides a warning message based on determining that the possibility of accident occurrence is greater than or equal to a preset value.

11 Claims, 14 Drawing Sheets

(58) Field of Classification Search
CPC .... G06N 3/0445; G06N 3/0454; G06N 3/084; G06N 3/02; G06Q 50/30
See application file for complete search history.

(56) References Cited

U.S. PATENT DOCUMENTS

| | | |
|---|---|---|
| 9,134,133 B2 | 9/2015 | Denaro |
| 9,286,793 B2 | 3/2016 | Pan et al. |
| 2009/0289812 A1 | 11/2009 | Kim et al. |
| 2016/0061625 A1 | 3/2016 | Wang |

FOREIGN PATENT DOCUMENTS

| | | | |
|---|---|---|---|
| JP | 2005-313658 A | | 11/2005 |
| JP | 2005313658 A | * | 11/2005 |
| JP | 2010-66827 A | | 3/2010 |
| JP | 2011-186940 A | | 9/2011 |
| JP | 20150045789 A | * | 10/2015 |
| KR | 10-2006-0092909 A | | 8/2006 |
| KR | 10-2014-0118153 A | | 10/2014 |
| KR | 10-2015-0045789 A | | 4/2015 |
| KR | 10-1633896 B1 | | 6/2016 |

OTHER PUBLICATIONS

English Translation_JPH0660300A (Year: 1992).*
English Translation_KR20150045789A (Year: 2015).*
International Search Report (PCT/ISA/210) dated Jul. 17, 2018, issued by International Searching Authority in corresponding International Application No. PCT/KR2018/003734.
Written Opinion (PCT/ISA/237) dated Jul. 17, 2018, issued by the International Searching Authority in corresponding International Application No. PCT/KR2018/003734.
Communication dated Jan. 25, 2022 issued by the Korean Intellectual Property Office in Korean Application No. 10-2017-0157851.

* cited by examiner

ELECTRONIC DEVICE, WARNING MESSAGE PROVIDING METHOD THEREFOR, AND NON-TRANSITORY COMPUTER-READABLE RECORDING MEDIUM

TECHNICAL FIELD

The disclosure relates to an electronic device, a warning message providing method therefor, and a non-transitory computer-readable recording medium, and more particularly, to an electronic device capable of preventing a similar accident by learning a traffic accident pattern, a warning message providing method therefor, and a non-transitory computer-readable recording medium.

The disclosure also relates to an artificial intelligence (AI) system simulating a recognition function, a decision function and the like of a human brain using a machine learning algorithm such as deep learning or the like, and an application thereof.

BACKGROUND ART

An artificial intelligence (AI) system is a computer system implementing human-level intelligence, and is a system in which a machine performs learning and determination by oneself and becomes smart, unlike an existing rule-based smart system. As the artificial intelligence system is more used, a recognition rate is improved and a user's taste may be more accurately understood. Therefore, the existing rule-based smart system has been gradually replaced by a deep learning-based artificial intelligence system.

An artificial intelligence technology includes machine learning (for example, deep learning) and element technologies using the machine learning. The machine learning is an algorithm technology of classifying and learning features of input data by oneself. The element technology is a technology of using a machine learning algorithm such as deep learning, or the like, and includes technical fields such as linguistic understanding, visual understanding, inference/prediction, knowledge representation, a motion control, and the like.

Various fields to which the artificial intelligence technology is applied are as follows. The linguistic understanding is a technology of recognizing and applying/processing human languages/characters, and includes natural language processing, machine translation, a dialog system, question and answer, speech recognition/synthesis, and the like. The visual understanding is a technology of recognizing and processing things like human vision, and includes object recognition, object tracking, image search, human recognition, scene understanding, space understanding, image improvement, and the like. The inference/prediction is a technology of determining and logically inferring and predicting information, and includes knowledge/probability-based inference, optimization prediction, preference-based planning, recommendation, and the like. The knowledge representation is a technology of automating and processing human experience information as knowledge data, and includes knowledge establishment (data generation/classification), knowledge management (data utilization), and the like. The motion control is a technology of controlling autonomous driving of a vehicle, a motion of a robot, and the like, and includes a motion control (navigation, collision, driving), an operation control (behavior control), and the like.

Meanwhile, conventionally, a person has directly performed a task of analyzing and classifying a cause of an accident at the time of occurrence of the accident. In addition, in the existing machine learning method, only a task of determining a cause according to a criterion classified by a person has been possible.

In addition, there are frequent accident regions of various causes depending on driver's driving habits or surrounding factors, but the frequent accident regions are displayed only by street signs, and it is thus difficult for a user to recognize an accurate accident risk factor.

DISCLOSURE

Technical Problem

The disclosure provides an electronic device capable of preventing a similar accident by learning an accident pattern using information that may be obtained from a vehicle at the time of occurrence of an accident and comparing the learned accident pattern and a current driving situation with each other to provide a warning message, a warning message providing method therefor, and a non-transitory computer-readable recording medium.

Technical Solution

According to an aspect of the disclosure, an electronic device may include: a position determination unit configured to determine a current position of the electronic device; a communication unit configured to receive accident data and a driving situation; an output unit configured to output a warning message; and a processor configured to establish a plurality of accident prediction models by learning the received accident data, select an accident prediction model to be applied among the plurality of accident prediction models based on of the current position determined by the position determination unit, determine an accident occurrence possibility using the selected accident prediction model, and control the output unit to provide the warning message when the determined accident occurrence possibility is a preset value or more.

The processor may set a region having a preset area as a frequent accident region when it is determined that an accident has occurred by a preset number of times or more within the region, and the plurality of accident prediction models may include a general accident prediction model that is applicable to all regions and at least one special accident prediction model that is applicable to at least one frequent accident region.

The processor may establish the general accident prediction model based on all accident data, and establish the special accident prediction model based on only accident data occurring in the frequent accident region.

The processor may classify the accident data for each accident type, determine frequencies for each accident type, and learn the accident data by assigning weights to each accident type depending on the determined frequencies.

The processor may select the special accident prediction model in a case where the determined current position is within the frequent accident region and select the general accident prediction model in other cases.

The processor may control the communication unit to collect a current driving situation, and determine the accident occurrence possibility by calculating a similarity between an accident occurrence situation learned by the accident prediction model and the collected current driving situation.

The processor may control the output unit to provide different warning messages stepwise as the accident occurrence possibility becomes large.

The processor may reinforce the general accident prediction model and the special accident prediction model with different weights when the accident occurs in the frequent accident region.

The accident data may include at least one of vehicle information at the time of occurrence of an accident, vehicle operation information, position information, road form information, weather information, distance information between vehicles, image information, acceleration information, or steering information.

The accident prediction model may be an artificial intelligence neural network model.

According to another aspect of the disclosure, a warning message providing method for an electronic device, includes: establishing a plurality of accident prediction models by learning accident data; selecting an accident prediction model to be applied among the plurality of accident prediction models based on a current position of the electronic device; determining an accident occurrence possibility using the selected accident prediction model; and providing a warning message when the determined accident occurrence possibility is a preset value or more.

The warning message providing method may further include setting a region having a preset area as a frequent accident region when it is determined that an accident has occurred by a preset number of times or more within the region, wherein the plurality of accident prediction models include a general accident prediction model that is applicable to all regions and at least one special accident prediction model that is applicable to at least one frequent accident region.

In the establishing, the general accident prediction model may be established based on all accident data, and the special accident prediction model may be established based on only accident data occurring in the frequent accident region.

In the establishing, the accident data may be classified for each accident type, frequencies for each accident type may be determined, and the accident data may be learned by assigning weights to each accident type depending on the determined frequencies.

The selecting may include: determining the current position of the electronic device; and selecting the special accident prediction model in a case where the determined current position is within the frequent accident region and selects the general accident prediction model in other cases.

The determining of the accident occurrence possibility may include: collecting a current driving situation; and determining the accident occurrence possibility by calculating a similarity between an accident occurrence situation learned by the accident prediction model and the collected current driving situation.

In the providing of the warning message, different warning messages may be provided stepwise as the accident occurrence possibility becomes large.

The warning message providing method may further include reinforcing the general accident prediction model and the special accident prediction model with different weights when the accident occurs in the frequent accident region.

The accident data may include at least one of vehicle information at the time of occurrence of an accident, vehicle operation information, position information, road form information, weather information, distance information between vehicles, image information, acceleration information, or steering information.

The accident prediction model may be an artificial intelligence neural network model. According to still another aspect of the disclosure, a non-transitory computer-readable recording medium includes a program for executing a warning message providing method for an electronic device, wherein the warning message providing method includes: establishing a plurality of accident prediction models by learning accident data; selecting an accident prediction model to be applied among the plurality of accident prediction models based on a current position of the electronic device; determining an accident occurrence possibility using the selected accident prediction model; and providing a warning message when the determined accident occurrence possibility is a preset value or more.

Advantageous Effects

As described above, according to the diverse embodiments of the disclosure, it is possible to prevent a similar accident by providing a warning message in a case where a situation similar to a situation where an accident has previously occurred occurs.

BEST MODE

Hereinafter, embodiments of the disclosure will be described in detail with reference to the accompanying drawings. In describing the disclosure, when it is decided that a detailed description for known functions or configurations related to the disclosure may unnecessarily obscure the gist of the disclosure, the detailed description therefor will be omitted. In addition, terms to be described below are defined in consideration of functions in the disclosure, and may be construed in different ways by users, operators, practices, or the like. Therefore, these terms should be defined on the basis of the contents throughout the specification.

Terms including ordinal numbers such as 'first', 'second', and the like, may be used to describe various components. However, these components are not limited by these terms. The terms are used only to distinguish one component from another component. For example, a 'first' component may be named a 'second' component and the 'second' component may also be similarly named the 'first' component, without departing from the scope of the disclosure. A term 'and/or' includes a combination of a plurality of related items or any one of the plurality of related items.

Terms used in the specification are used to describe embodiments, and are not intended to restrict and/or limit the disclosure. Singular forms are intended to include plural forms unless the context clearly indicates otherwise. It will be further understood that the terms "include" or "have" used in the specification, specify the presence of features, numerals, operations, components, parts mentioned in the specification, or a combination thereof, but do not preclude the presence or addition of one or more other features, numerals, operations, components, parts, or a combination thereof.

In embodiments, a 'module' or a 'unit' may perform at least one function or operation, and be implemented by hardware or software or be implemented by a combination of hardware and software. In addition, a plurality of 'modules' or a plurality of 'units' may be integrated in at least one module and be implemented by at least one processor except for a 'module' or a 'unit' that needs to be implemented by specific hardware.

Meanwhile, in the disclosure, a term "user" may refer to a person using an electronic device or a device (for example, an artificial intelligence electronic device) using an electronic device.

Hereinafter, the disclosure will be described in detail with reference to the accompanying drawings.

Figure 1:
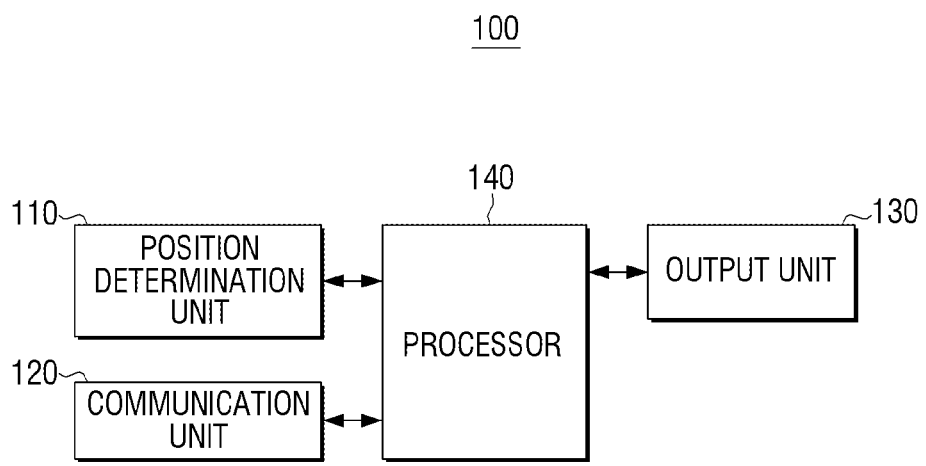
FIG. 1 is a schematic block diagram for describing components of an electronic device according to an embodiment of the disclosure.

FIG. 1 is a block diagram for describing components of an electronic device 100 according to an embodiment of the disclosure. The electronic device 100 may be implemented by a mobile device such as a smartphone, a tablet personal computer (PC), or a laptop computer. In addition, the electronic device 100 may also be implemented by an in-vehicle infotainment (IVI) mounted in a vehicle. The IVI, which collectively refers to as a device installed in the vehicle, refers to a device that provides audio and visual entertainment. For example, the IVI may be implemented by a navigation device, a black box, a car audio system, a head-up display (HUD), or the like.

The electronic device 100 may establish an accident prediction model alone and prevent a similar accident on the basis of the established accident prediction model. In addition, the electronic device 100 may interlock with an external device such as a server 200. An accident prediction model may be established in the server 200, and the electronic device 100 may receive and use the accident prediction model from the server 200. First, in describing an embodiment of FIG. 1, it is assumed that the electronic device 100 is operated alone. An embodiment in which the electronic device interlocks with the server 200 will be again described later.

Referring to FIG. 1, the electronic device 100 may include a position determination unit 110, a communication unit 120, an output unit 130, and a processor 140.

The position determination unit 110 may determine a current position of the electronic device 100. The position determination unit 110 may be implemented by a global navigation satellite system (GNSS). Examples of the GNSS may include a global positioning system (GPS), a Galileo positioning system, and a global navigation satellite system (GLONASS). The electronic device 100 may determine an accident prediction model to be applied, on the basis of the current position determined in the position determination unit 110.

The communication unit 120 may transmit and receive data and/or control signals to and from an external device. For example, the communication unit 120 may receive accident data, a current driving situation, an accident prediction model, and the like, from the external device. In addition, the communication unit 120 may transmit a control signal for instructing the output unit 130 to output a warning message to the external device.

The output unit 130 may output the warning message. For example, the output unit 130 may output at least one of a visual signal or an auditory signal. As another example, the output unit 130 does not directly provide a message to the user, and may also provide a warning message to the external device.

The processor 140 may establish an accident prediction model on the basis of the accident data. In addition, the processor 140 may determine whether or not a current driving situation is similar to a situation at the time of occurrence of an accident on the basis of the established accident prediction model. When a similarity is a preset value or more, the processor 140 may provide the warning message to the user. Therefore, the electronic device 100 may prevent an accident similar to an existing accident example.

In addition, according to diverse embodiments of the disclosure, the electronic device 100 may obtain accident prediction data using the received accident data as input data of a recognition model. In the disclosure, a learned recognition model may be established in consideration of an application field of the recognition model, computer performance of the device, or the like. A learned object recognition model may be, for example, a model based on a neural network. The object decision model may be designed to simulate a human brain structure on a computer, and may include a plurality of network nodes simulating neurons of a human neutral network and having weights. The plurality of network nodes may form a connection relationship thereamong to simulate synaptic activity of the neurons transmitting and receiving signals through synapses. In addition, the object recognition model may include, for example, a neutral network model or a deep learning model developed from the neutral network model. In the deep learning model, the plural of network nodes may be positioned at different depths (or layers), and may transmit and receive data thereamong depending on a convolution connection relationship. Examples of the object recognition model may include a deep neural network (DNN), a recurrent neural network (RNN), a bidirectional recurrent deep neural network (BRDNN), and the like, but are not limited thereto.

In addition, the electronic device 100 may use an artificial intelligence agent to obtain the warning message for the received accident data as described above. In this case, the artificial intelligence agent, which is a dedicated program for providing an artificial intelligence (AI) based service (for example, a speech recognition service, a secretary service, a translation service, a search service, or the like), may be executed by an existing general-purpose processor (for example, a central processing unit (CPU)) or a separate AI dedicated processor (for example, a graphic processing unit (GPU), or the like).

Figure 2:
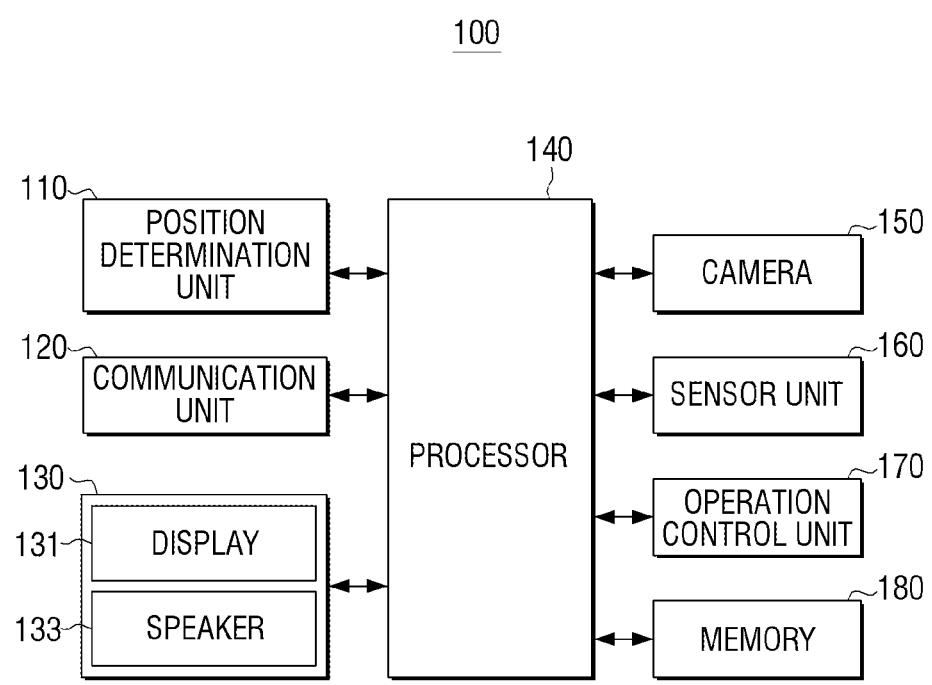
FIG. 2 is a block diagram for describing the components of the electronic device according to an embodiment of the disclosure in detail.

FIG. 2 is a block diagram for describing the components of the electronic device 100 according to an embodiment of the disclosure in detail. Referring to FIG. 2, the electronic device 100 includes the position determination unit 110, the communication unit 120, the output unit 130, the processor 140, a camera 150, a sensor unit 160, an operation control unit 170, and a memory 180.

The electronic device 100 may further include various components such as an image processing unit (not illustrated), an image analyzing unit (not illustrated), a power supply unit (not illustrated), and the like, in addition to the components illustrated in the embodiment of FIG. 2. In addition, the electronic device 100 is not necessarily limited to being implemented to include all of the components illustrated in FIG. 2. For example, the electronic device 100 implemented without the camera 150 may also receive image data from the external device through the communication unit 120.

The position determination unit 110 may include a circuit, software, and the like, for implementing the GNSS. A type of applied GNSS may be changed depending on a specification of each of the electronic devices 100 to be implemented. For example, the applied GNSS may be one of the GPS, the Galileo positioning system, or the GLONASS. In addition, the position determination unit 110 may compositely use an assisted GPS (A-GPS), a differential GPS (D-GPS), or the like. The position determination unit 110 may determine the current position of the electronic device 100 by additionally using position information of access points (AP), base stations, or the like, connected through the communication unit 120.

The communication unit 120 performs communication with the external device. For example, the external device may be implemented by a server, a cloud storage, a network, or the like. The electronic device 100 may receive the accident data from the external device and directly perform establishment, learning, updating, and the like, of the accident prediction model. In addition, the electronic device 100 may receive the accident prediction model established in the external device. For example, when the electronic device 100 enters a specific frequent accident region, the communication unit 120 may request an external server to transmit an accident prediction model corresponding to a corresponding frequent accident region.

To this end, the communication unit 120 may include various communication modules such as a short-range wireless communication module (not illustrated), a wireless communication module (not illustrated), and the like. Here, the short-range wireless communication module is a module for performing communication with an external device positioned in a short range in a short-range wireless communication manner such as Bluetooth, Zigbee or the like. In addition, the wireless communication module is a module connected to an external network according to a wireless communication protocol such as WiFi, WiFi direct, IEEE, or the like, to perform communication. In addition, the wireless communication module may further include a mobile communication module accessing a mobile communication network according to various mobile communication protocols such as $3^{rd}$ generation (3G), $3^{rd}$ generation partnership project (3GPP), long term evolution (LTE), LTE advanced (LTE-A), and the like, to perform communication.

The output unit 130 may output the warning message in various manners. For example, the output unit 130 may be implemented by a display 131 to display a visual warning message. As another example, the output unit 130 may be implemented by a speaker 133 to display an auditory warning message. As still another example, the output unit 130 may be implemented by a light emitting diode (LED) (not illustrated) to output a flicker signal. The warning message may be simultaneously output through the display 131 and the speaker 133.

The display 131 may display the warning message. For example, the display 131 may be implemented in a form of a head-up display (HUD) on a front glass of a vehicle. The display 131 may be implemented by a liquid crystal display (LCD), an organic light emitting display (OLED), a plasma display panel (PDP), or the like, and display various screens that may be provided through the electronic device 100.

The speaker 133 may output a voice. For example, the speaker 133 may output the warning message in a form of an alarm sound or a voice message as well as various audio data. The speaker 133 may be embedded in the electronic device 100, and may be implemented in a form of an output port such as a jack, or the like.

The camera 150 may capture a still image or a moving image. For example, the camera 150 may capture an image of a front region of the vehicle. The processor 140 may obtain acceleration information, steering information, or the like, of the vehicle using a difference between captured image frames.

The camera 150 may be implemented by an image sensor such as a charge coupled device (CCD), a complementary metal oxide semiconductor (CMOS), or the like. The CCD is an element in which the respective metal-oxide-silicon capacitors are disposed to positions very adjacent to each other and electric charge carriers are stored in and transferred from the capacitors. The CMOS image sensor is an element in which MOS transistors are manufactured as many as the number of pixels using a CMOS technology of using a control circuit and a signal processing circuit as peripheral circuits and a switching manner of sequentially detecting outputs using the MOS transistors is adopted.

In a case where the electronic device 100 is implemented in a form in which the camera 150 is not present, the processor 140 may control the communication unit 120 to receive image information from a black box device, or the like, installed in the vehicle.

The sensor unit 160 may measure a distance from the vehicle to the surrounding environment. The sensor unit 160 may collect information on a distance to another vehicle or a distance to traffic facility such as a center strip. In a case where the electronic device 100 is not one component device of the vehicle (for example, in a case where the electronic device 100 is implemented by a mobile device), the processor 140 may control the communication unit 120 to receive distance information between the vehicle and the surrounding vehicle from the sensor unit 160 of the vehicle.

The operation control unit 170 may control an operation of the vehicle. For example, the operation control unit 170 may be implemented by an electronic control unit (ECU), which is a system electronically managing all of the operations of the vehicle. The processor 140 may receive steering wheel operation information, accelerator/brake information, component state information such as an engine, and the like, from the operation control unit 170. In a case where the electronic device 100 is not one component device of the vehicle, the processor 140 may control the communication unit 120 to receive operation information from the operation control unit 170 of the vehicle.

The memory 180 may store various modules, software, and data for driving the electronic device 100. For example, accident data, a generated warning message, collected driving information, and the like, may be stored in the memory 180. As another example, an accident prediction module that may be used to determine an accident occurrence possibility may be stored in the memory 180.

The memory 180, which is a storage medium storing various programs, or the like, required for operating the electronic device 100, may be implemented by a form such as a flash memory, a hard disk drive (HDD), a solid state drive (SSD), or the like. For example, the memory 180 may include a read only memory (ROM) for storing a program for performing the operation of the electronic device 100, a random access memory (RAM) for temporarily storing data depending on the performance of the operation of the electronic device 100.

The processor 140 may control the abovementioned components of the electronic device 100. For example, the processor 140 may control the output unit 130 to output the warning message.

The processor 140 may be implemented by a single CPU to perform accident prediction model establishment and update, determination of an accident prediction model to be applied, driving information collection and analysis, warning message generation, or the like, and may be implemented by a plurality of processors or and IP performing a specific function.

The processor 140 may learn the accident data received through the communication unit 120 to establish at least one accident prediction model. For example, the processor 140 may analyze the accident data in a deep learning manner to determine a criterion for classifying an accident type. In addition, the processor 140 may classify accident examples according to the criterion.

The processor 140 may separately establish a general accident prediction model that may be used in all regions and special accident prediction models that may be used only in specific regions. For example, the processor 140 may set specific regions as frequent accident regions and establish special accident prediction model for each of the set frequent accident regions.

When it is analyzed that an accident has occurred by a preset number of times or more within a region having a preset area on the basis of the accident data, the processor 140 may set a corresponding region as the frequent accident region.

The processor 140 may establish the general accident prediction model on the basis of all accident data. In addition, the processor 140 may establish the special accident prediction model on the basis of only accident data occurring within the set frequent accident region.

The processor 140 may analyze an accident type frequently occurring in the frequent accident region. The processor 140 may learn the accident data by assigning a weight different from that of the general accident prediction model depending on the accident frequency for each analyzed accident type.

The processor 140 may determine an accident prediction model to be applied among a plurality of accident prediction models on the basis of the current position of the electronic device 100. For example, the processor 140 may determine whether or not the electronic device 100 has entered the frequent accident region on the basis of the current position of the electronic device 100 determined in the position determination unit 110. As another example, the processor 140 may determine how long the electronic device 100 will enter the frequent accident region by additionally using map data.

When it is determined that the electronic device 100 has entered the frequent accident region, the processor 140 may determine an accident occurrence possibility using a special accident prediction model corresponding to the frequent accident region. In addition, when it is determined that the electronic device has exited from the frequent accident region, the processor 140 may determine an accident occurrence possibility using the general accident prediction model.

The processor 140 may collect a current driving situation. In addition, the processor 140 may calculate a similarity between the collected current driving situation and an accident occurrence situation learned by the accident prediction model. For example, the collected current driving situation may include at least one of vehicle information, steering wheel operation information, accelerator/brake operation information, gear information, position information, road form information, weather information, distance information to the surrounding vehicle, image information, acceleration information, or steering information.

When the similarity is a preset value or more, the processor 140 may provide a warning message indicating that there is an accident occurrence possibility. For example, the processor 140 may set a plurality of preset criterion values. In addition, the processor 140 may provide different types of warning messages whenever the similarity becomes high to exceed the preset criterion values.

As another example, the processor 140 may change a content of the warning message on the basis of an accident type determined depending on the similarity. When it is determined that a possibility that a speeding accident will occur is high, the processor 140 may provide a warning message whose content is "reduce a speed". In a case where the electronic device has entered a region in which road kill frequently occurs, the processor 140 may provide a warning message whose content is "pay attention to a wild animal that suddenly jumps into the vehicle".

Meanwhile, as described above, as the processor 140, an existing general-purpose processor (for example, a CPU or an application processor) may perform the operations described above, but a dedicated hardware chip for artificial intelligence (AI) may perform specific operations.

More specific operations of the processor 140 will hereinafter be described again with reference the accompanying drawings.

Figure 3:
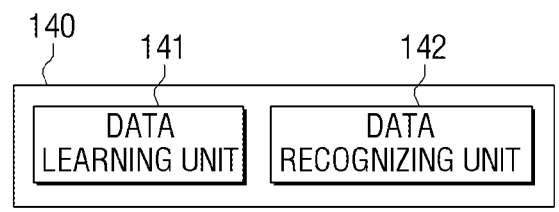
FIG. 3 is a block diagram of a processor according to some embodiments of the disclosure.

FIG. 3 is a block diagram of the processor 140 according to some embodiments of the disclosure. Referring to FIG. 3, the processor 140 according to some embodiment may include a data learning unit 141 and a data recognizing unit 142.

The data learning unit 141 may learn a criterion for accident type classification, accident occurrence cause analysis, or the like. The processor 140 may calculate an accident occurrence possibility from the accident data according to the learned criterion. In addition, the processor 140 may classify the accident data into the respective types according to the learned criterion.

The data learning unit 141 may determine what data to use to establish the accident prediction model. The data learning unit 141 may learn a criterion for an accident occurrence possibility, accident cause analysis, and accident type classification by obtaining data to be used for learning and applying the obtained data to a data recognition model to be described below.

The data recognizing unit 142 may recognize a situation from predetermined data from the learned data recognition model. The data recognizing unit 142 may obtain the predetermined data according to a preset criterion by learning, and use the data recognition model using the obtained data as an input value. For example, the data recognizing unit 142 may calculate the similarity between the current driving situation and the accident occurrence situation learned using the learned accident prediction model. The data recognizing unit 142 may update the accident prediction model by again using the current driving situation and data obtained from a new accident occurrence situation as input values. As such, the data recognizing unit 142 may collect accident data from big data and self-collected data.

At least one of the data learning unit 141 or the data recognizing unit 142 may be manufactured in a form of a single or plurality of hardware chips and be mounted in the electronic device 100. For example, at least one of the data learning unit 141 or the data recognizing unit 142 may be manufactured in a form of a dedicated hardware chip for AI or may be manufactured as a part of an existing general-purpose processor (for example, a CPU or an application processor) or an IP for a specific function and be mounted on the various electronic devices 100 described above.

A case where both of the data learning unit 141 and the data recognizing unit 142 are mounted in the electronic device 100 has been illustrated in the embodiment of FIG. 3, but the data learning unit 141 and the data recognizing unit 142 may also be mounted on separate devices, respectively. For example, one of the data learning unit 141 or the data recognizing unit 142 may be included in the electronic device 100 and the other of the data learning unit 141 or the data recognizing unit 142 may be included in the server 200. In addition, the data learning unit 141 and the data recognizing unit 142 may be connected to each other in a wired or wireless manner, such that model information established by the data learning unit 141 may be provided to the data recognizing unit 142 and data input to the data recognizing unit 142 may be provided as additional learning data to the data learning unit 141.

Meanwhile, at least one of the data learning unit 141 or the data recognizing unit 142 may be implemented by a software module. In a case where at least one of the data learning unit 141 or the data recognizing unit 142 is implemented by the software module (or a program module including an instruction), the software module may be stored in a non-transitory computer-readable recording medium. At least one software module may be provided by an operating system (OS) or may be provided by a predetermined application. Alternatively, a portion of at least one software module may be provided by an OS or the other portion of at least one software module may be provided by a predetermined application.

Figure 4A:
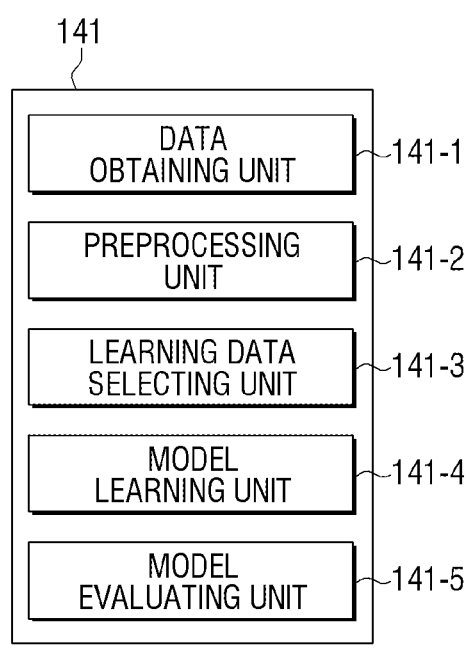
FIG. 4A is a block diagram of a data learning unit according to some embodiments of the disclosure.

FIG. 4A is a block diagram of the data learning unit 141 according to some embodiments of the disclosure. Referring to FIG. 4A, the data learning unit 141 according to some embodiments may include a data obtaining unit 141-1, a preprocessing unit 141-2, a learning data selecting unit 141-3, a model learning unit 141-4, and a model evaluating unit 141-5.

The data obtaining unit 141-1 may obtain data required for situation determination. The data obtaining unit 141-1 may receive learning data through a network. For example, the data obtaining unit 141-1 may receive traffic accident related big data classified for each accident type as the learning data. In addition, the data obtaining unit 141-1 may correct information on the current driving situation and use the collected information as the learning data.

The preprocessing unit 141-2 may preprocess the obtained data so that the obtained data may be used for learning for the situation determination. The preprocessing unit 141-2 may process the obtained data into a preset format so that a model learning unit 141-4 to be described below may use the obtained data for the learning for the situation determination.

The learning data selecting unit 141-3 may select data required for the leaning among the preprocessed data. The selected data may be provided to the model learning unit 141-4. The learning data selecting unit 141-3 may select the data required for the leaning among the preprocessed data according to a preset criterion for the situation determination. In addition, the learning data selecting unit 141-3 may select the data according to a preset criterion by learning by a model learning unit 141-4 to be described below.

For example, at the initial stage of learning, the learning data selecting unit 141-3 may configure a learning data set only using data having different types of thinking. That is, for the purpose of initial learning, the learning data selecting unit 141-3 may select accident data included in a type having a low similarity to learn a criterion for easily classifying an accident type.

In addition, the learning data selecting unit 141-3 may select accident data satisfying, in common, one of preset criteria by learning. Therefore, the model learning unit 141-4 may learn a criterion different from a criterion learned in advance.

The model learning unit 141-4 may learn a criterion that may classify what type of accident the accident is on the basis of the learning data. In addition, the model learning unit 141-4 may learn a criterion on what learning data should be used for accident type classification.

The model learning unit 141-4 may learn a data recognition model used for the situation determination using the learning data. In this case, the data recognition model may be a model established in advance. For example, an accident prediction model, which is a data recognition model recognizing traffic accident data, may be a model established in advance by receiving basic learning data (for example, traffic accident data on occurrence of a death accident).

The data recognition model may be established in consideration of an application field of the recognition model, a purpose of the learning, computer performance of the device, or the like. The data recognition model may be, for example, a model based on a neural network. The data recognition model may be, for example, a model such as a deep neural network (DNN), a recurrent neural network (RNN), a bidirectional recurrent deep neural network (BRDNN), but is not limited thereto.

According to diverse embodiments, in a case where there are a plurality of data recognition models established in advance, the model learning unit 141-4 may determine a data recognition model in which a relation between input learning data and the basic learning data is large as a data recognition model to be learned. In this case, the basic learning data may be classified in advance for each of the types of data, and the data recognition model may be established in advance for each of the types of data. For example, the basic learning data may be classified in advance according to various criteria such as a region in which the learning data is generated, a time at which the learning data is generated, a size of the learning data, a genre of the learning data, a generator of the learning data, a type of an object in the learning data, and the like.

In addition, the model learning unit 141-4 may learn the data recognition model using a learning algorithm or the like, including, for example, an error back-propagation or a gradient descent.

For example, the model learning unit 141-4 may learn the data recognition model through supervised learning using the learning data as an input value. As another example, the model learning unit 141-4 may learn the data recognition model through unsupervised learning that finds a criterion for situation determination by learning a type of data required for the situation determination by oneself without separate supervision. As still another example, the model learning unit 141-4 may learn the data recognition model through reinforcement learning that uses feedback on whether or not a result of the situation determination according to the learning is correct.

In addition, when the data recognition model is learned, the model learning unit 141-4 may store the learned data recognition model. In this case, the model learning unit 141-4 may store the learned data recognition model in the memory 180 of the electronic device 100. In addition, the model learning unit 141-4 may also store the learned data recognition model in a memory of the server 200 connected to the electronic device 100 through a wired or wireless network.

In this case, the memory 180 in which the learned data recognition model is stored may also store a command or data related to at least one other component of the electronic device 100. In addition, the memory 180 may also store software and/or a program. For example, the program may include a kernel, a middleware, an application programming interface (API), an application program (or "application"), and the like.

The model evaluating unit 141-5 may input evaluation data to the data recognition model, and may allow the model learning unit 141-4 to again learn the data recognition model in a case where a recognition result output from the evaluation data does not satisfy a predetermined criterion. In this case, the evaluation data may be preset data for evaluating the data recognition model.

In an initial recognition model configuring step, the evaluation data may be accident data in which accident types and damage scales are different from each other. The evaluation data may be subsequently replaced by an accident data set in which similarities of accident forms gradually coincide with each other. Therefore, the model evaluating unit 141-5 may gradually verify performance of the data recognition model (for example, the accident prediction model).

For example, the model evaluating unit 141-5 may evaluate that the learned data recognition model does not satisfy a predetermined criterion in a case where the number or a ratio of evaluation data whose recognition results are not accurate exceeds a preset threshold value among recognition results of the learned data recognition model for the evaluation data. For example, in a case where the predetermined criterion is defined as a ratio of 2%, when the learned data recognition model outputs erroneous recognition results with respect to evaluation data exceeding twenty evaluation data among a total of 1,000 evaluation data, the model evaluating unit 141-5 may evaluate that the learned data recognition model is not appropriate.

Meanwhile, in a case where there are a plurality of learned data recognition models, the model evaluating unit 141-5 may evaluate whether or not the respective learned data recognition models satisfy a predetermined criterion, and determine a learned data recognition model satisfying the predetermined criterion as a final data recognition model. In this case, in a case where the number of learned data recognition models satisfying the predetermined criterion is plural, the model evaluating unit 141-5 may determine any one preset learned data recognition model or a predetermined number of learned data recognition models as a final data recognition model in descending order of an evaluation score.

Meanwhile, at least one of the data obtaining unit 141-1, the preprocessing unit 141-2, the learning data selecting unit 141-3, the model learning unit 141-4, or the model evaluating unit 141-5 within the data learning unit 141 may be manufactured in a form of at least one hardware chip and be mounted in the electronic device. For example, at least one of the data obtaining unit 141-1, the preprocessing unit 141-2, the learning data selecting unit 141-3, the model learning unit 141-4, or the model evaluating unit 141-5 may be manufactured in a form of a dedicated hardware chip for AI or may be manufactured as a part of an existing general-purpose processor (for example, a CPU or an application processor) or an IP for a specific function and be mounted on the various electronic devices 100 described above.

In addition, the data obtaining unit 141-1, the preprocessing unit 141-2, the learning data selecting unit 141-3, the model learning unit 141-4, and the model evaluating unit 141-5 may be mounted in one electronic device or may be mounted in separate electronic devices, respectively. For example, some of the data obtaining unit 141-1, the preprocessing unit 141-2, the learning data selecting unit 141-3, the model learning unit 141-4, and the model evaluating unit 141-5 may be included in the electronic device 100, and the others of the data obtaining unit 141-1, the preprocessing unit 141-2, the learning data selecting unit 141-3, the model learning unit 141-4, and the model evaluating unit 141-5 may be included in the server 200.

Meanwhile, at least one of the data obtaining unit 141-1, the preprocessing unit 141-2, the learning data selecting unit 141-3, the model learning unit 141-4, or the model evaluating unit 141-5 may be implemented by a software module. In a case where at least one of the data obtaining unit 141-1, the preprocessing unit 141-2, the learning data selecting unit 141-3, the model learning unit 141-4, or the model evaluating unit 141-5 is implemented by the software module (or a program module including an instruction), the software module may be stored in a non-transitory computer-readable recording medium. At least one software module may be provided by an operating system (OS) or may be provided by a predetermined application. Alternatively, a portion of at least one software module may be provided by an OS or the other portion of at least one software module may be provided by a predetermined application.

Figure 4B:
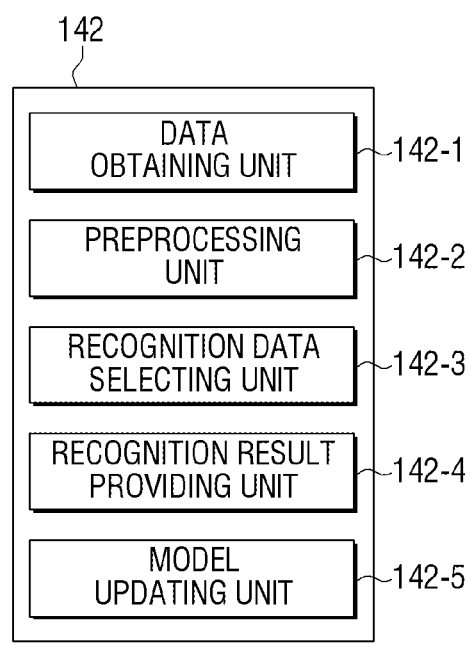
FIG. 4B is a block diagram of a data recognizing unit according to some embodiments of the disclosure.

FIG. 4B is a block diagram of the data recognizing unit 142 according to some embodiments of the disclosure. Referring to FIG. 4B, the data recognizing unit 142 according to some embodiments may include a data obtaining unit 142-1, a preprocessing unit 142-2, a recognition data selecting unit 142-3, a recognition result providing unit 142-4, and a model updating unit 142-5.

The data obtaining unit 142-1 may obtain data required for situation determination, and the preprocessing unit 142-2 may preprocess the obtained data so that the obtained data may be used for the situation determination. The preprocessing unit 142-2 may process the obtained data into a preset format so that a recognition result providing unit 142-4 to be described below may use the obtained data for the situation determination.

The recognition data selecting unit 142-3 may select data required for the situation determination among the preprocessed data. The selected data may be provided to the recognition result providing unit 142-4. The recognition data selecting unit 142-3 may select some or all of the preprocessed data according to a preset criterion for the situation determination. In addition, the recognition data selecting unit 142-3 may select the data according to a preset criterion by learning by a model learning unit 142-4 to be described below.

The recognition result providing unit 142-4 may apply the selected data to a data recognition model to determine a situation. The recognition result providing unit 142-4 may provide a recognition result according to a data recognition purpose. The recognition result providing unit 142-4 may apply the selected data to the data recognition model by using the data selected by the recognition data selecting unit 142-3 as an input value. In addition, the recognition result may be determined by the data recognition model.

For example, the recognition result providing unit 142-4 may recognize input current driving state data according to an accident type classifying criterion determined in an accident prediction model (data recognition model). In addition, the recognition result providing unit 142-4 may calculate a similarity between a current driving state and a driving state at the time of occurrence of an accident using the accident prediction model. The processor 140 may determine an accident occurrence possibility on the basis of the calculated similarity to determine whether or not to provide a warning message.

The model updating unit 142-5 may allow the data recognition model to be updated on the basis of evaluation of the recognition result provided by the recognition result providing unit 142-4. For example, the model updating unit 142-5 may provide the recognition result provided by the recognition result providing unit 142-4 to the model learning unit 141-4 to allow the model learning unit 141-4 to update the data recognition model.

Meanwhile, at least one of the data obtaining unit 142-1, the preprocessing unit 142-2, the recognition data selecting unit 142-3, the recognition result providing unit 142-4, or the model updating unit 142-5 within the data recognizing unit 142 may be manufactured in a form of at least one hardware chip and be mounted in the electronic device. For example, at least one of the data obtaining unit 142-1, the preprocessing unit 142-2, the recognition data selecting unit 142-3, the recognition result providing unit 142-4, or the model updating unit 142-5 may be manufactured in a form of a dedicated hardware chip for AI or may be manufactured as a part of an existing general-purpose processor (for example, a CPU or an application processor) or an IP for a specific function and be mounted on the various electronic devices 100 described above.

In addition, the data obtaining unit 142-1, the preprocessing unit 142-2, the recognition data selecting unit 142-3, the recognition result providing unit 142-4, and the model updating unit 142-5 may be mounted in one electronic device or may be mounted in separate electronic devices, respectively. For example, some of the data obtaining unit 142-1, the preprocessing unit 142-2, the recognition data selecting unit 142-3, the recognition result providing unit 142-4, or the model updating unit 142-5 may be included in the electronic device 100, and the others of the data obtaining unit 142-1, the preprocessing unit 142-2, the recognition data selecting unit 142-3, the recognition result providing unit 142-4, or the model updating unit 142-5 may be included in the server 200.

Meanwhile, at least one of the data obtaining unit 142-1, the preprocessing unit 142-2, the recognition data selecting unit 142-3, the recognition result providing unit 142-4, or the model updating unit 142-5 may be implemented by a software module. In a case where at least one of the data obtaining unit 142-1, the preprocessing unit 142-2, the recognition data selecting unit 142-3, the recognition result providing unit 142-4, or the model updating unit 142-5 is implemented by the software module (or a program module including an instruction), the software module may be stored in a non-transitory computer-readable recording medium. At least one software module may be provided by an operating system (OS) or may be provided by a predetermined application. Alternatively, a portion of at least one software module may be provided by an OS or the other portion of at least one software module may be provided by a predetermined application.

Figure 5:
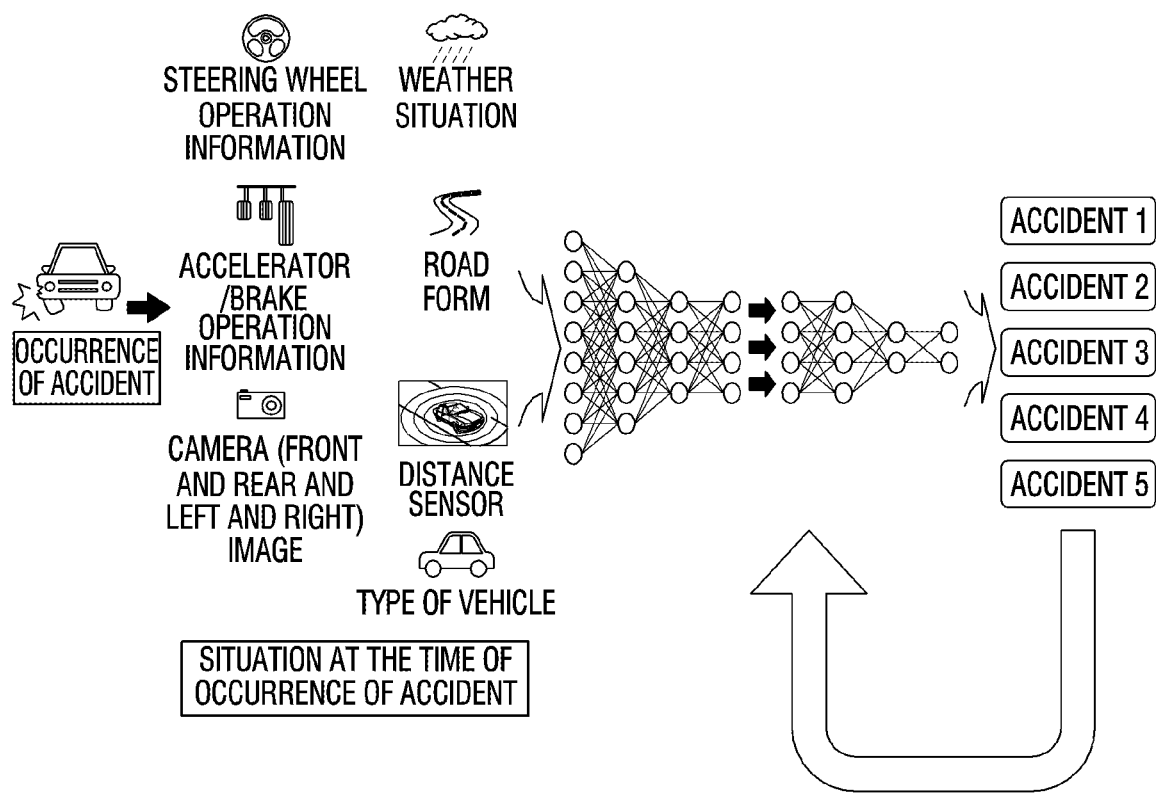
FIG. 5 is a view for describing an accident prediction model establishment method for the electronic device according to an embodiment of the disclosure.

FIG. 5 is a view for describing an accident prediction model establishment method for the electronic device 100 according to an embodiment of the disclosure. The processor 140 may learn an accident pattern using information that may be obtained from a vehicle at the time of occurrence of an accident. In addition, the processor 140 may establish an accident prediction model using a deep learning manner.

When it is determined that the accident has occurred, the electronic device 100 may collect data at the time of occurrence of the accident. For example, the electronic device 100 may determine whether or not the accident has occurred on the basis of malfunction information of components of the vehicle interlocking with the electronic device 100, whether or not an airbag is activated, collision information collected through the camera 150 or the sensor unit 160, and the like.

As another example, the electronic device 100 may constantly monitor a driving situation. In addition, in a case where the monitoring is suddenly interrupted, the electronic device 100 may regard a finally monitored driving situation as data at the time of occurrence of the accident.

For example, the collected accident data may include at least one of vehicle information at the time of occurrence of the accident, operation information of the vehicle, position information, road form information, weather information, distance information between vehicles, image information, acceleration information, or steering information.

The processor 140 may establish the accident prediction model on the basis of the collected accident data using a machine learning method such as deep learning. In addition, the processor 140 may determine data on what type of accident the accident data is according to an accident type classification criterion learned through the deep learning. In the embodiment of FIG. 5, an accident prediction model in which an accident type is classified into five types is illustrated. For example, the processor 140 may classify the respective accident data into types such as speeding, overtaking, sliding, and the like.

The processor 140 may establish a general accident prediction model that may be used in all regions and special accident prediction models that are specialized for specific regions. For example, the processor 140 may set specific regions in which an accident frequently occurs as frequent accident regions. In addition, the processor 140 may establish an accident prediction model specialized for a specific accident type by analyzing accident types for each set frequent accident region.

Figure 6:
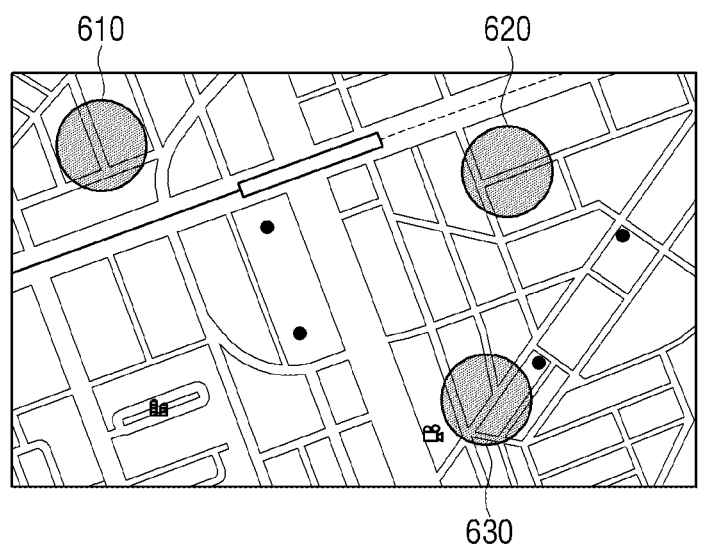
FIG. 6 is a view for describing a method for setting a frequent accident region according to an embodiment of the disclosure.

FIG. 6 is a view for describing a method for setting a frequent accident region according to an embodiment of the disclosure. When it is determined that an accident has occurred by a preset number of times or more within a region having a preset area, the processor 140 may set a corresponding region as a frequent accident region. For example, FIG. 6 illustrates an embodiment in which three places 610, 620, and 630 are set as frequent accident regions.

The processor 140 may determine frequencies for each type of accidents occurring in the respective frequent accident regions. In addition, the processor 140 may establish special accident prediction models in which weights are assigned to the accident types depending on the frequencies.

For example, the processor 140 may determine that it is thickly foggy in a first frequent accident region 610 at the time of occurrence of the accident, in common, as a result of analyzing accident data (for example, weather information, image information, and the like) collected in the first frequent accident region 610. In addition, the processor 140 may collect information on the first frequent accident region 610 through the Internet, or the like. Therefore, the processor 140 may recognize the first frequent accident region 610 is a region in which it is instantaneously thickly foggy.

As another example, the processor 140 may recognize that a second frequent accident region 620 is a region in which an intervention accident frequently occurs, as a result of analyzing accident data (for example, image information, acceleration information, accelerator/brake information, road form information, and the like) collected in the second frequent accident region 620.

As still another example, the processor 140 may recognize that a third frequent accident region 630 is a region in which a road kill accident frequently occurs, as a result of analyzing accident data (for example, image information, accelerator/brake information, steering information, and the like) collected in the third frequent accident region 630. The processor 140 may also collect information related to the third frequency accident region 630 through the Internet or the like, and verify a recognized result. For example, the processor 140 may search for news related to road kill occurring in the third frequent accident region 630.

The processor 140 may establish special accident prediction models appropriate for the respective frequent accident regions 610, 620, and 630 on the basis of the recognized results.

Figure 7:
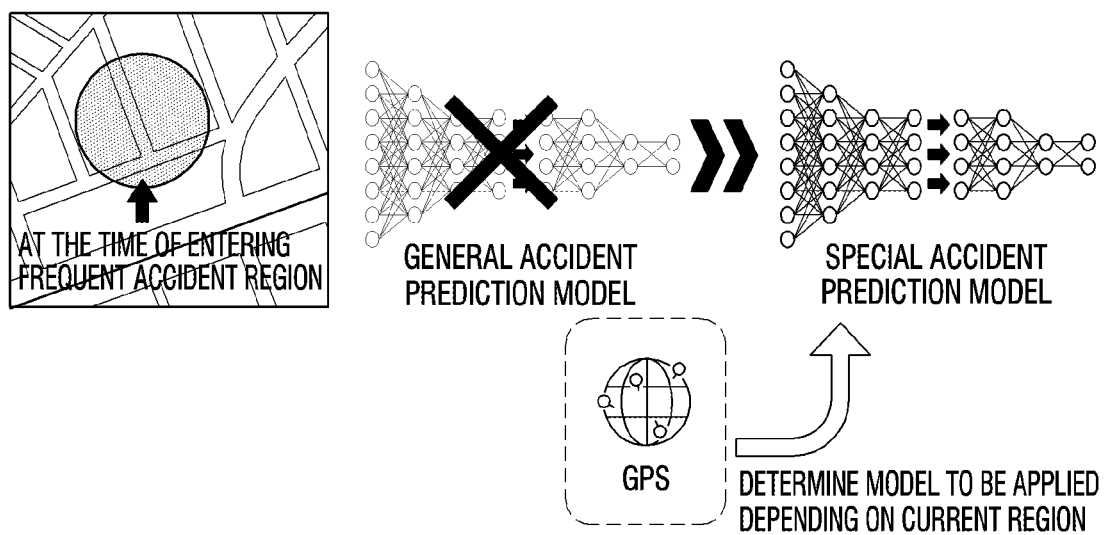
FIG. 7 is a view for describing modifying an accident prediction model applied depending on a current position of the electronic device.

FIG. 7 is a view for describing modifying an accident prediction model applied depending on a current position of the electronic device 100. The processor 140 may select an accident prediction model to be applied among a plurality of established accident prediction models on the basis of the current position of the electronic device 100 determined in the position determination unit 110.

As illustrated in FIG. 7, when it is determined that the electronic device 100 has entered a frequent accident region from a general region, the processor 140 may change an accident prediction model to be applied from a general accident prediction model to a special accident prediction model corresponding to the frequent accident region that the electronic device 100 enters. In a case where the electronic device 100 operated in a manner of downloading the accident prediction model from the server 200 enters the frequent accident region, the processor 140 may control the communication unit 120 to request the server 200 to transmit the special accident prediction model.

The processor 140 may estimate an expected time in which the electronic device 100 will enter the frequent accident region with reference to the current position determined in the position determination unit 110, map information, driving speed information, and the like. The processor 140 may allow the accident prediction model to be changed at the same of entry of the electronic device 100 into the frequent accident region by loading the special accident prediction model from the memory 180 (or downloading the special accident prediction model from the server 200) before the electronic device 100 enters the frequent accident region.

Figure 8:
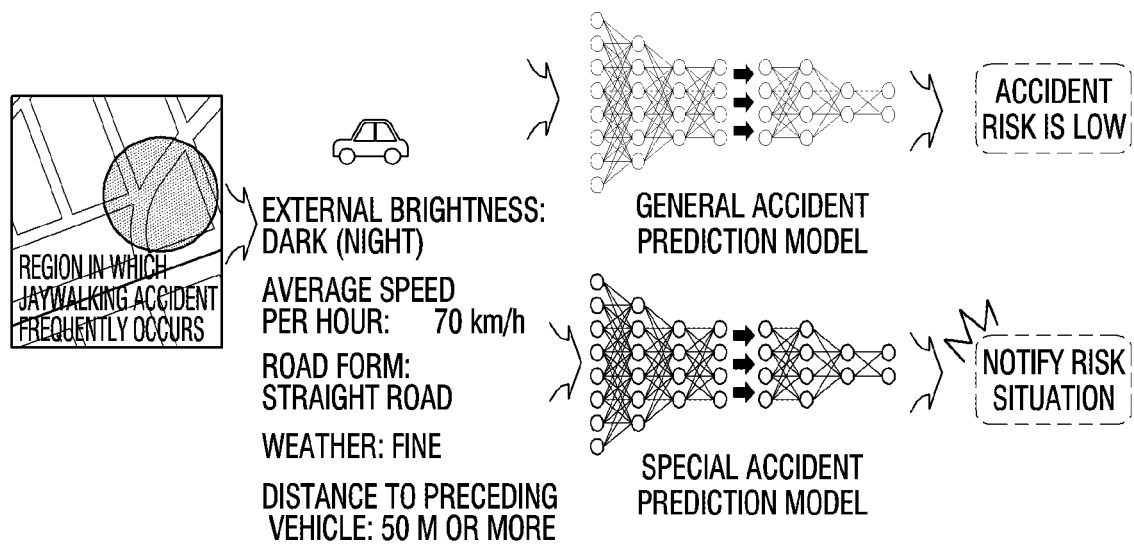
FIG. 8 is a view for describing a difference between a case of applying a general accident prediction model and a case of applying a special accident prediction model.

FIG. 8 is a view for describing a difference between a case of applying the general accident prediction model and a case of applying the special accident prediction model. In a case where the remaining driving situations except for the position are the same as each other, it may be changed whether or not to provide a warning message of the electronic device 100 depending on an accident prediction model to be applied. The reason is that an attention point for accident prevention is changed in a specific region.

The processor 140 may collect a current driving situation. In an embodiment of FIG. 8, the processor 140 may collect external brightness, an average speed per hour, a road form, weather information, and distance information to a preceding vehicle. When a general accident prediction model is used, the processor 140 may determine that an accident occurrence possibility is lower than a preset value. Therefore, the processor 140 may determine that the warning message is not provided.

As illustrated in FIG. 8, the processor 140 may establish a special accident prediction model for a frequent accident region in which a jaywalking accident frequently occurs. When the special accident prediction model is used, the processor 140 may determine that an accident occurrence possibility is higher than a preset value for the same driving situation. The processor 140 may control the output unit 130 to provide the warning message to a user.

Figure 9:
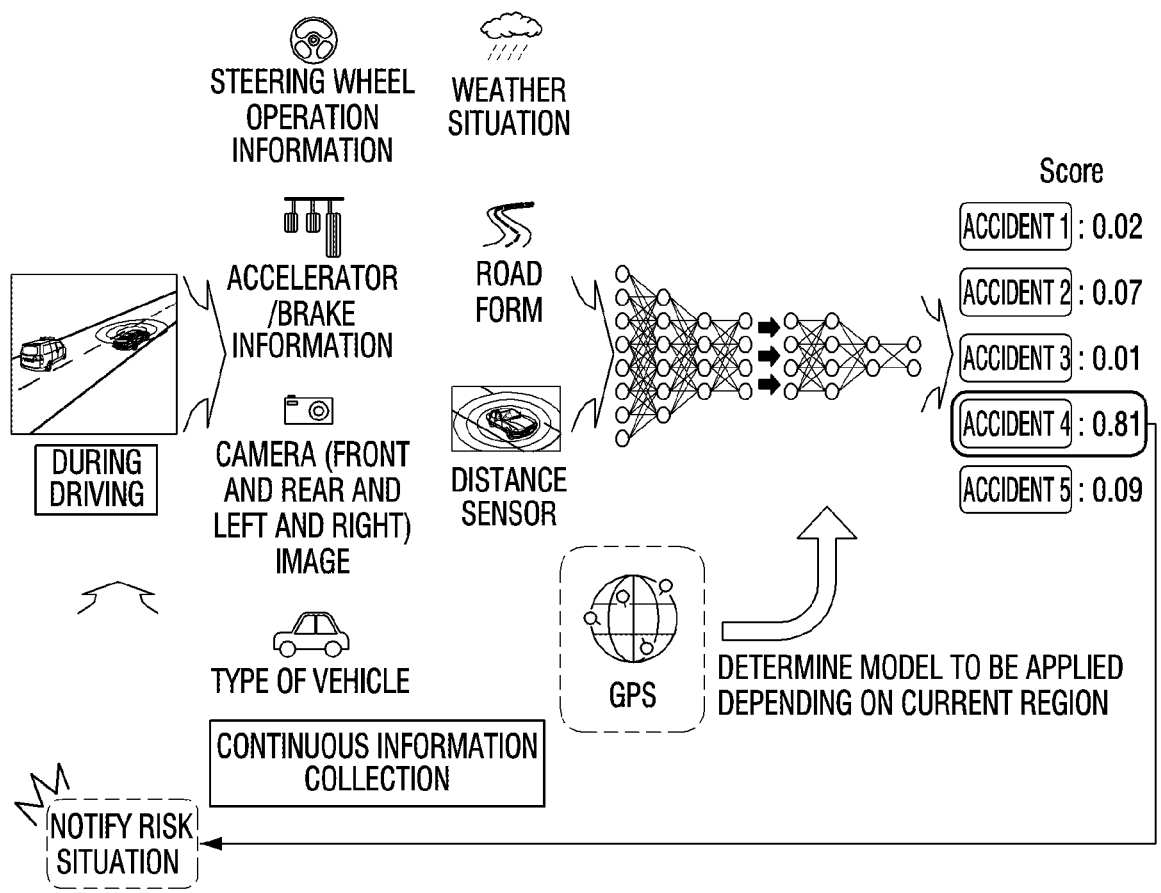
FIG. 9 is a view illustrating a method in which the electronic device according to an embodiment of the disclosure provides different warning messages for each accident.

FIG. 9 is a view illustrating a method in which the electronic device 100 according to an embodiment of the disclosure provides different warning messages for each accident. The processor 140 may continuously collect driving information while the vehicle is being driven. For example, the collected driving information may be at least one of vehicle information, steering wheel operation information, accelerator/brake operation information, gear information, position information, road form information, weather information, distance information to the surrounding vehicle, image information, acceleration information, or steering information.

The processor 140 may analyze data on the collected current driving situation using an accident prediction model. An accident prediction model to be applied may be determined depending on a current position of the electronic device 100. The processor 140 may calculate a similarity between an accident occurrence situation learned by the accident prediction model and the collected current driving situation.

For example, the processor 140 may calculate similarities between each of various accident types classified in the accident prediction model and the current driving situation. In an embodiment of FIG. 8, the processor 140 may calculate similarities between accident occurrence situations of each of Accident Types 1 to 5 and the collected current driving situations.

When it is assumed that a preset value is 0.7, a similarity between the current driving situation and an accident occurrence situation of Accident Type 4 is 0.81, and the processor 140 may thus provide a warning message. The processor 140 may provide a warning message corresponding to Accident Type 4. For example, in a case where Accident Type 4 is an intervention accident type due to a narrowed road, the processor 140 may control the output unit 130 to output a warning message specialized for an accident type, such as "please pay attention to a vehicle in the other lane because it is expected that the vehicle in the other lane will intervene".

According to an embodiment of the disclosure, the electronic device 100 may also provide different warning messages depending on accident possibility levels. The processor 140 may set a plurality of threshold values and compare similarity values between the current driving situation and the accident occurrence situations with the respective threshold values.

For example, when the similarity value exceeds 0.5, the processor 140 may provide a warning message for an item similar to the accident occurrence situation. The processor 140 may provide a voice message such as "an accident may occur when a driving speed exceeds 70 km/h".

In addition, the processor 140 may provide a stronger warning message when the similarity value exceeds 0.7. For example, the processor 140 may provide an imperative voice message such as "please reduce a speed". In addition, the processor 140 may output a visual warning message together with a voice message, using the display 133, a light emitting diode (LED) (not illustrated), or the like.

As the accident occurrence possibility is increased as described above, the processor 140 may control the output unit 130 to provide a stronger warning message.

Figure 10:
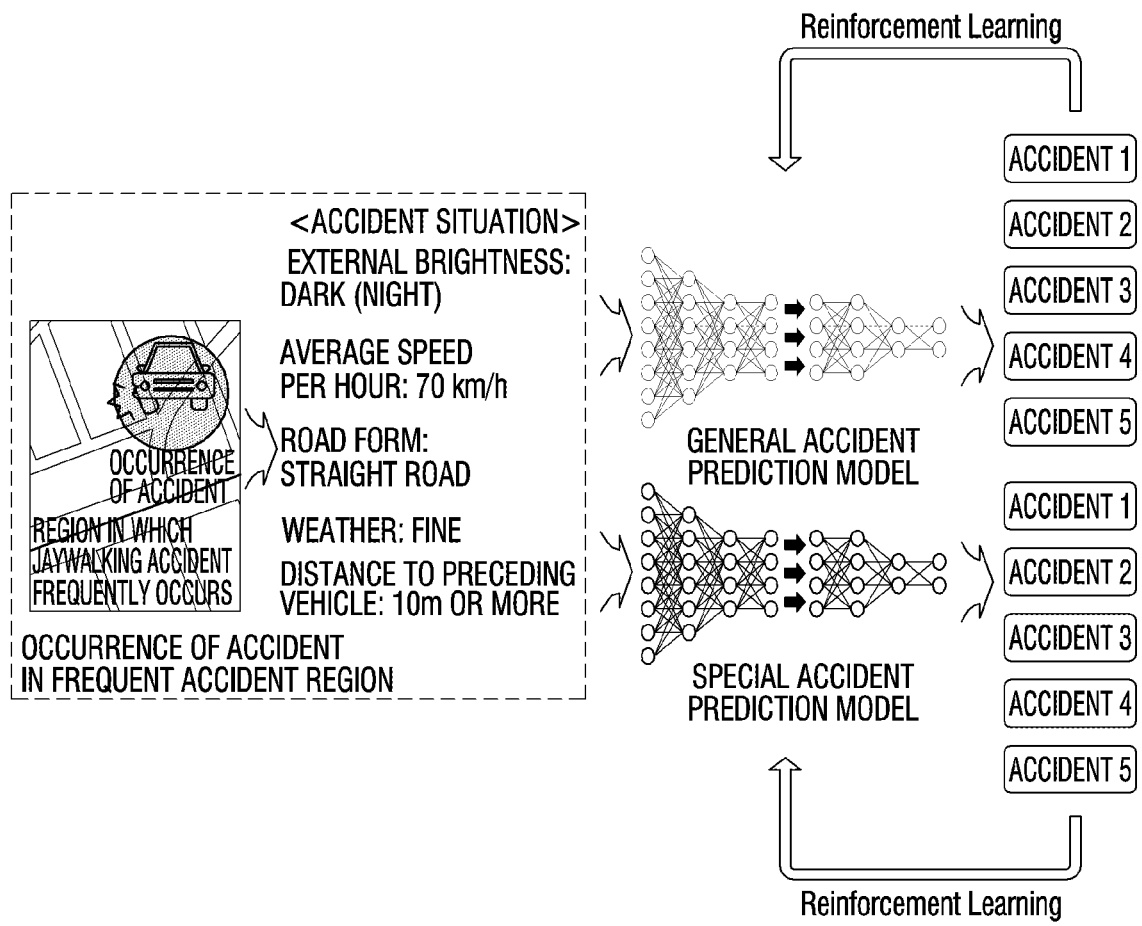
FIG. 10 is a view for describing reinforcement-learning a general accident prediction model and a special accident prediction model with different weights at the time of occurrence of an accident.

FIG. 10 is a view for describing reinforcement-learning a general accident prediction model and a special accident prediction model with different weights at the time of occurrence of an accident. FIG. 10 illustrates a case where an accident occurs within a frequent accident region in which a jaywalking accident frequently occurs.

In a case where the accident occurs, the processor 140 may reinforce an accident prediction model using data at the time of occurrence of the accident. For example, the processor 140 may reinforce the accident prediction model using external brightness, an average speed per hour, a road form, weather information, distance information to a preceding vehicle, and the like, at the time of occurrence of the accident as input values.

In a case where the accident occurs in the frequent accident region, there is a need to reinforcement-learn both of a special accident prediction model applied to the frequent accident region and a general accident prediction model applied to all regions. Therefore, the processor 140 may reinforcement-learn both of the general accident prediction model and the special accident prediction model.

However, the processor 140 may reinforce the respective accident prediction models by assigning different weights to accident data.

In a case where a driving situation at the time of occurrence of the accident illustrated in FIG. 10 is analyzed by the general accident prediction model, it may be determined that an accident occurrence possibility is low. In a case in which accident data of FIG. 10 to which the same weight as that of the other accident is assigned is input to the general accident prediction model, a problem that an error occurs in statistics due to accident data corresponding to a rare case may occur. Therefore, the processor 140 may reinforcement-learn the general accident prediction model by assigning a low weight to the accident data occurring in the frequent accident region.

To the contrary, in which the driving situation at the time of occurrence of the accident is analyzed by the special accident prediction model, it may be determined that the accident occurrence possibility is high. Particularly, in a case where an accident corresponding to an accident type having a high frequency occurs in the frequent accident region, the processor 140 may reinforcement-learn the special accident prediction model by assigning a high weight to the accident data.

Figure 11:
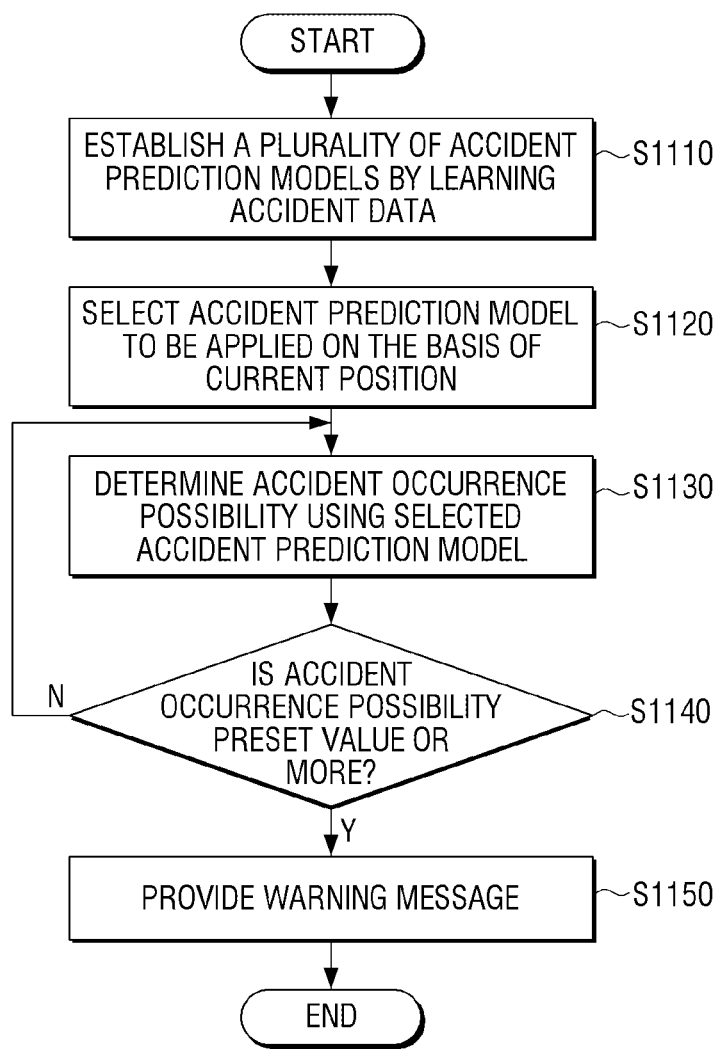
FIG. 11 is a flow chart for describing a warning message providing method for the electronic device according to an embodiment of the disclosure.

FIG. 11 is a flow chart for describing a warning message providing method for the electronic device 100 according to an embodiment of the disclosure.

Referring to FIG. 11, the electronic device 100 may establish a plurality of accident prediction models by learning accident data (S1110). The plurality of accident prediction models may include a general accident prediction model that may be applied to all regions and at least one special accident prediction model. The special accident prediction model may be each established for each frequent accident region.

When it is determined that an accident has occurred by a preset number of times or more within a region having a preset area, the electronic device 100 may set a corresponding region as a frequent accident region. The electronic device 100 may establish the special accident prediction model on the basis of only accident data occurring within the set frequent accident region. The electronic device 100 may analyze the accident data occurring in the frequent accident region to determine an accident type having a high frequency. In addition, the electronic device 100 may establish the special accident prediction model specialized to prevent an accident of the accident type determined to have the high frequent.

The electronic device 100 may select an accident prediction model to be applied among the plurality of accident prediction models on the basis of a current position (S1120). For example, the electronic device 100 may determine the current position using a satellite navigation device such as a GPS. As another example, the electronic device 100 may communicate with an external navigation device to receive current position information.

In a case where the determined current position is within the frequent accident region, the electronic device 100 may apply a special accident prediction model corresponding to the frequent accident region that the electronic device 100 enters. To the contrary, in a case where the determined current position is out of the frequent accident region, the electronic device 100 may apply the general accident prediction model.

Then, the electronic device 100 may determine an accident occurrence possibility using the selected accident prediction model (S1130). The electronic device 100 may collect a current driving situation. In addition, the electronic device 100 may compare an accident occurrence situation learned by the accident prediction model and the collected current driving situation with each other to measure a similarity therebetween. The electronic device 100 may determine the accident occurrence possibility on the basis of the measured similarity. For example, as a current driving speed, weather, a road form, or the like, become similar to those in a case where an accident frequently occurs, the electronic device 100 may determine that the accident occurrence possibility becomes high.

The electronic device 100 may set a threshold value in advance and compare the threshold value and the accident occurrence possibility with each other (S1140). When the accident occurrence possibility is a preset value or more (S1140-Y), the electronic device 100 may provide a warning message to a user (S1150). The electronic device 100 may provide different warning messages depending on accident types and accident occurrence possibilities. For example, the electronic device 100 may provide a coping method (for example, deceleration, the next lane gaze, and the like) depending on the accident type as the warning message. As another example, the electronic device 100 may provide a stronger warning message as the accident occurrence possibility is increased.

Figure 12:
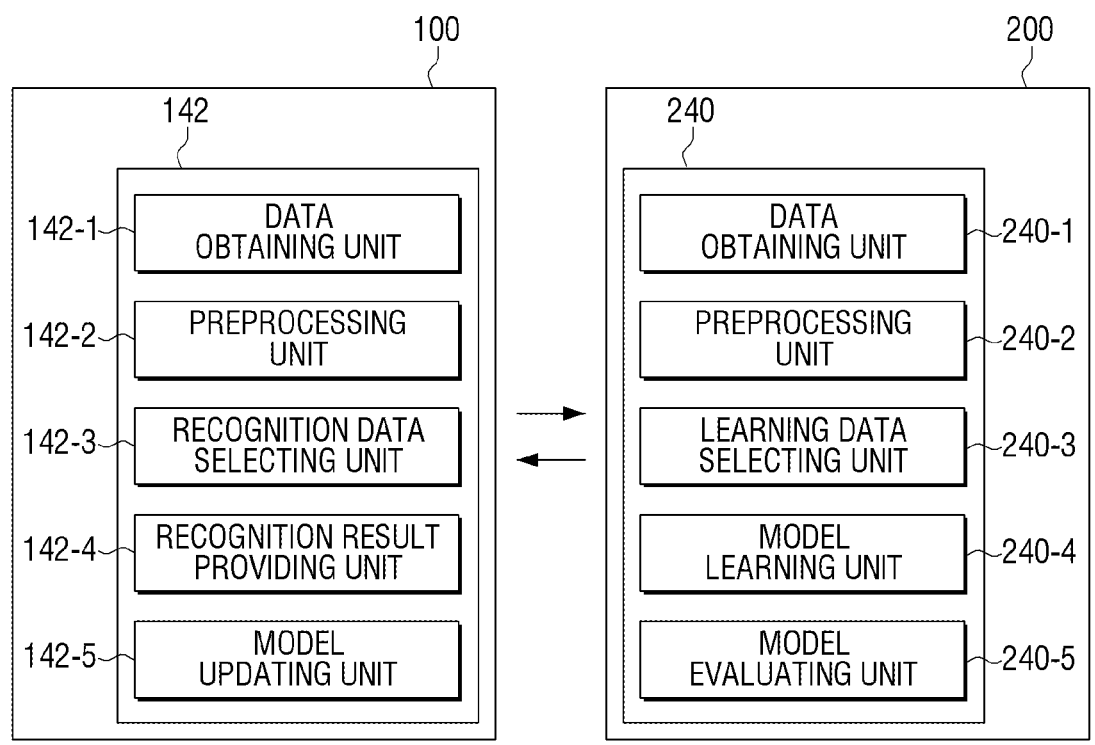
FIG. 12 is a view for describing an electronic device interlocking with a server according to another embodiment of the disclosure.

FIG. 12 is a view for describing an electronic device 100 interlocking with a server 200 according to another embodiment of the disclosure. Referring to FIG. 12, the electronic device 100 and the server 200 may learn and recognize data by interlocking with each other.

The server 200 may learn a criterion for accident situation recognition, and the electronic device 100 may determine an accident occurrence possibility, an accident type, and the like, on the basis of a learning result by the server 200.

In this case, a data learning unit 240 of the server 200 may perform a function of the data learning unit 141 illustrated in FIG. 4A. For example, the data learning unit 240 of the server 200 may learn a criterion for accident type analysis. The server 200 may analyze accident data according to the learned criterion to establish an accident prediction model. The data learning unit 240 may determine what data to use to learn/reinforce the accident prediction model. In addition, the data learning unit 240 may learn a criterion for determining an accident occurrence possibility, an accident type, and the like, using the determined data. The data learning unit 240 may learn a criterion for feature analysis by obtaining data to be used for the learning and applying the obtained data to a data recognition model to be described below.

In addition, the recognition result providing unit 142-4 of the electronic device 100 may determine a situation by applying the data selected by the recognition data selecting unit 142-3 to an accident prediction model generated by the server 200. In addition, the recognition result providing unit 142-4 may receive the accident prediction model generated by the server 200 from the server 200, and perform image analysis, content type determination, and the like, using the received accident prediction model. The electronic device 100 may receive a corresponding special accident prediction model in a case where it is adjacent to a frequent accident region. In addition, the model updating unit 142-5 of the electronic device 100 may provide the accident prediction model to a model learning unit 240-4 of the server 200 to update the accident prediction model.

That is, the electronic device 100 may use the accident prediction model generated using computing power of the server 200. In addition, accident data learned or recognized in a plurality of electronic devices 100 may be transmitted to the server 200 to allow the server 200 to update the accident prediction model. In addition, the accident data learned or recognized in each of the plurality of electronic devices 100 and driving hobby data may be transmitted to the server 200 to allow the server 200 to generate accident prediction models personalized appropriately for the respective electronic devices 100.

Figure 13:
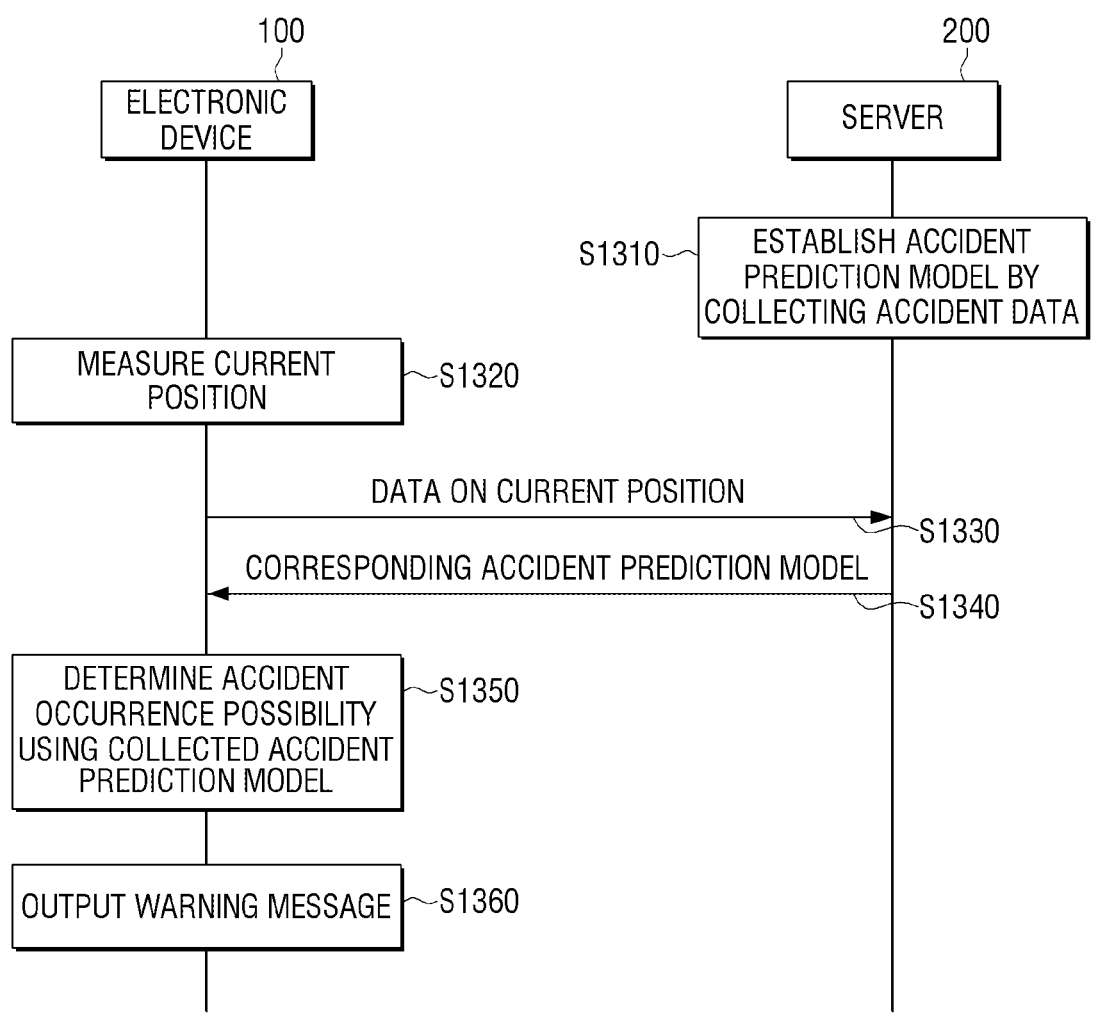
FIG. 13 is a sequence diagram for describing operations of the electronic device and the server according to another embodiment of the disclosure.

FIG. 13 is a sequence diagram for describing operations of the electronic device 100 and the server 200 according to another embodiment of the disclosure.

In this case, the electronic device 100 may include a general-purpose processor, and the server 200 may include an artificial intelligence processor. Alternatively, the electronic device 100 may include at least one application, and the server 200 may include an operating system. The server 200, which is a component that is more integrated or dedicated or has a smaller delay, more excellent performance, or more resources as compared with the electronic device 100, may be a component that may more rapidly and effectively perform many calculations required at the time of generating, updating, or applying a recognition model as compared with the electronic device 100.

In this case, an interface for transmitting and receiving data between the electronic device 100 and the server 200 may be defined.

As an example, an application program interface (API) having learning data to be applied to the recognition model as a factor value (or a parameter value or a transfer value) may be defined. The API may be defined as a set of sub-routines or functions that may be invoked in any one protocol (as an example, a protocol defined in the electronic device 100) for any processing of another protocol (as an example, a protocol defined in the server 200). That is, an environment in which operations of another protocol may be performed in any one protocol may be provided through the API.

The server 200 may establish an accident prediction model by collecting accident data through various paths (S1310). For example, the server 200 may establish the accident prediction model using accident data obtained from the National Police Agency, a navigation company, and the like, and accident data transmitted from the respective electronic devices 100.

The server 200 may establish a general accident prediction model that may be applied to all regions. In addition, the server 200 may set frequent accident region, and may establish a special accident prediction model specialized for the set frequent accident region. Because accident prediction models that may be applied are different from each other depending on regions as described above, the electronic device 100 should measure a current position (S1320).

The electronic device 100 may transmit data on the measured current position to the server 200 (S1330). Then, the server 200 may transmit an accident prediction model corresponding to the position of the electronic device 100 (S1340).

The electronic device 100 may determine an accident occurrence possibility using the received accident prediction model (S1350). Then, in a case where the accident occurrence possibility is a preset value or more, the electronic device 100 may provide a warning message to a user (S1360).

According to the diverse embodiments of the disclosure, the electronic device 100 may prevent a similar accident from occurring by analyzing a traffic accident situation that has previously occurred using the artificial intelligence by oneself and providing the warning message to the user in a case where the current driving situation is similar to the accident situation.

Terms "~ unit" used in the disclosure may include units configured by hardware, software, or firmware, and may be used compatibly with terms such as, for example, logics, logic blocks, components, circuits, or the like. A module may be an integrally configured component or a minimum unit performing one or more functions or a part thereof. For example, the module may be configured by an application-specific integrated circuit (ASIC).

The diverse embodiments of the document may be implemented by software including instructions stored in a machine-readable storage medium (for example, a computer-readable storage medium). A machine may be a device that invokes the stored instruction from the storage medium and may be operated depending on the invoked instruction, and may include the electronic device (for example, the electronic device A) according to the disclosed embodiments. In a case where a command is executed by the processor, the processor may directly perform a function corresponding to the command or other components may perform the function corresponding to the command under a control of the processor. The command may include codes created or executed by a compiler or an interpreter. The machine-readable storage medium may be provided in a form of a non-transitory storage medium. Here, the term 'non-transitory' means that the storage medium is tangible without including a signal, and does not distinguish whether data are semi-permanently or temporarily stored in the storage medium.

According to an embodiment, the methods according to the diverse embodiments disclosed in the document may be included and provided in a computer program product. The computer program product may be traded as a product between a seller and a purchaser. The computer program product may be distributed in a form of a storage medium (for example, a compact disc read only memory (CD-ROM)) that may be read by the machine or online through an application store (for example, PlayStore™). In a case of the online distribution, at least portions of the computer program product may be at least temporarily stored in a storage medium such as a memory of a server of a manufacturer, a server of an application store, or a relay server or be temporarily created.

Each of the components (for example, modules or programs) according to the diverse embodiments may include a single entity or a plurality of entities, and some of the corresponding sub-components described above may be omitted or other sub-components may be further included in the diverse embodiments. Alternatively or additionally, some of the components (for example, the modules or the programs) may be integrated into one entity, and may perform functions performed by the respective corresponding components before being integrated in the same or similar manner. Operations performed by the modules, the programs, or the other components according to the diverse embodiments may be executed in a sequential manner, a parallel manner, an iterative manner, or a heuristic manner, at least some of the operations may be performed in a different order or be omitted, or other operations may be added.

The invention claimed is:

1. A warning message providing method for an electronic device, comprising:
 establishing a general accident prediction model that is applicable to all regions and at least one special accident prediction model that is applicable to at least one frequent accident region by learning accident data;
 determining a current position of the electronic device;
 selecting the special accident prediction model in a case where the determined current position is within a frequent accident region and selecting the general accident prediction model in other cases;
 determining an accident occurrence possibility using the selected accident prediction model; and
 providing a warning message based on determining that the accident occurrence possibility is a preset value or more,
 wherein in the establishing, the general accident prediction model is established based on all accident data, and the special accident prediction model is established based on only accident data occurring in the frequent accident region.

2. The warning message providing method as claimed in claim 1, further comprising setting a region having a preset area as a frequent accident region when it is determined that an accident has occurred by a preset number of times or more within the region.

3. The warning message providing method as claimed in claim 1, wherein in the establishing, the accident data are classified for each accident type, frequencies for each accident type are determined, and the accident data are learned by assigning weights to each accident type depending on the determined frequencies.

4. The warning message providing method as claimed in claim 1, wherein the determining of the accident occurrence possibility includes:
 collecting a current driving situation; and
 determining the accident occurrence possibility by calculating a similarity between an accident occurrence situation learned by the selected accident prediction model and the collected current driving situation.

5. The warning message providing method as claimed in claim 4, wherein the providing of the warning message, different warning messages are provided stepwise as the accident occurrence possibility becomes large.

6. The warning message providing method as claimed in claim 1, further comprising reinforcing the general accident prediction model and the special accident prediction model with different weights when the accident occurs in the frequent accident region.

7. The warning message providing method as claimed in claim 1, wherein the accident data includes at least one of vehicle information at the time of occurrence of an accident, vehicle operation information, position information, road form information, weather information, distance information between vehicles, image information, acceleration information, or steering information.

8. The warning message providing method as claimed in claim 1, wherein the accident prediction model is an artificial intelligence neural network model.

9. An electronic device comprising:
 a position determination unit configured to determine a current position of the electronic device;
 a communication unit configured to receive accident data and a driving situation;
 an output unit configured to output a warning message; and
 a processor configured to:
 establish a general accident prediction model that is applicable to all regions and at least one special accident prediction model that is applicable to at least one frequent accident region by learning the received accident data, determine a current position of the electronic device;

select the special accident prediction model in a case where the determined current position is within a frequent accident region and select the general accident prediction model in other cases, determine an accident occurrence possibility using the selected accident prediction model, and control the output unit to provide the warning message based on determining that the accident occurrence possibility is a preset value or more, wherein the processor is further configured to establish the general accident prediction model based on all accident data, and establish the special accident prediction model based on only accident data occurring in the frequent accident region.

10. The electronic device as claimed in claim 9, wherein the processor sets a region having a preset area as a frequent accident region when it is determined that an accident has occurred by a preset number of times or more within the region.

11. The electronic device as claimed in claim 10, wherein the processor classifies the accident data for each accident type, determines frequencies for each accident type, and learns the accident data by assigning weights to each accident type depending on the determined frequencies.

* * * * *